(Model.)
W. E. DOOLITTLE.
MANUFACTURE OF MATCHES.
No. 337,821.  Patented Mar. 16, 1886.
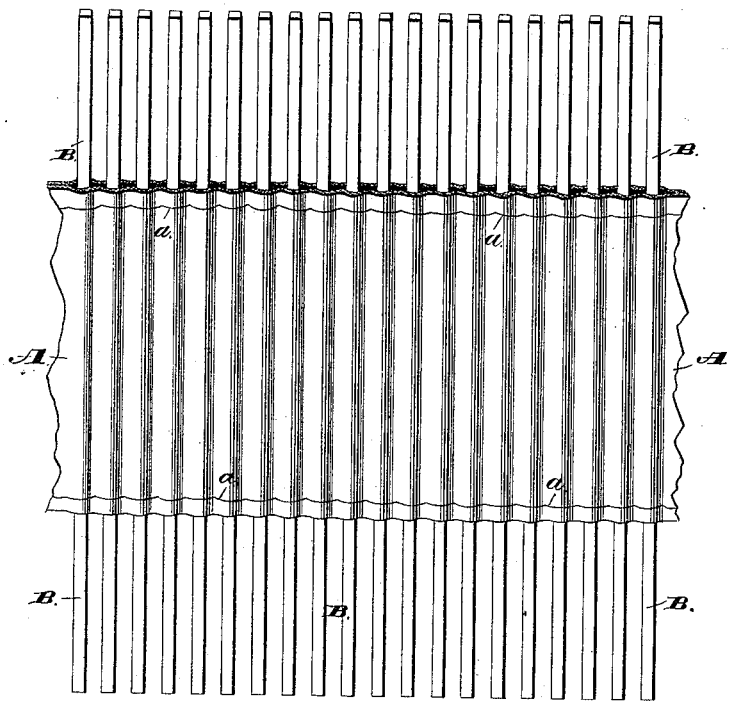

UNITED STATES PATENT OFFICE.

WILLIAM E. DOOLITTLE, OF NEW HAVEN, CONNECTICUT.

MANUFACTURE OF MATCHES.

SPECIFICATION forming part of Letters Patent No. 337,821, dated March 16, 1886.

Application filed April 21, 1884. Serial No. 128,741. (Model.)

*To all whom it may concern:*

Be it known that I, WILLIAM E. DOOLITTLE, of New Haven, in the county of New Haven, and in the State of Connecticut, have invented certain new and useful Improvements in the Manufacture of Matches; and I do hereby declare that the following is a full, clear, and exact description thereof, reference being had to the accompanying drawing, making a part of this specification, which is a perspective view of a series of match-splints secured in position for receiving the igniting material.

In the manufacture of matches it has heretofore been customary to place the splints between strips of webbing and then roll the same up into the form of a cylinder, of which the contiguous ends of said splints formed the ends, after which said ends were coated with igniting material, and said splints then released from between said strips of webbing, and then cut centrally so as to form from each two matches.

The design of my invention is to lessen the cost and simplify the manufacture of matches, to which end said invention consists in the method as hereinafter described, and more specifically set forth in the claims.

In the carrying into practice of my invention I employ two strips of webbing, A, which are arranged in parallel lines and have between their contiguous faces match-splints B, that are placed at a right angle to the line of said strips, and are preferably separated by spaces of about one-fourth of an inch. Said strips A are secured together, so as to confine in relative position between the same said splints B, by means of one or more rows of sewing, *a*, which is done by a machine, and is of the kind known as "chain-stitch."

The strips of webbing A may have any desired length, but are each preferably about five hundred feet long, and after the ends of the splints B have been coated with the necessary igniting material are separated by unraveling the rows of stitches *a*, so as to release said splints and permit the same to be cut in two.

Match-splints thus confined in relative positions may be handled with ease and safety, and their ends coated with igniting material in any manner found advantageous.

The strips of webbing may be used without injury for a long time, as there is but slight wear to the same, and the only waste which occurs from this method is in the matter of thread.

Having thus fully set forth the nature and merits of my invention, what I claim as new is—

1. As an improvement in the art of manufacturing matches, the method of preparing match-splints for the reception of the igniting material, which consists in arranging the splints in a continuous series between two strips of webbing, and then securing said splints in position by means of one or more rows of stitches, substantially as and for the purpose described.

2. As an improvement in the art of making matches, the method of preparing the match-splints for the reception of the igniting material, which consists in arranging the splints in a continuous series between two strips of webbing, and then securing said splints in position by means of one or more rows of chain-stitch sewing, substantially as and for the purpose described.

In testimony that I claim the foregoing I have hereunto set my hand this 16th day of April, A. D. 1884.

W. E. DOOLITTLE.

Witnesses:
GEO. S. PRINDLE,
RUFUS S. PICKETT.